Aug. 11, 1964  J. C. SETECKA  3,144,181
PARTICLE DISPENSER
Filed Jan. 23, 1963
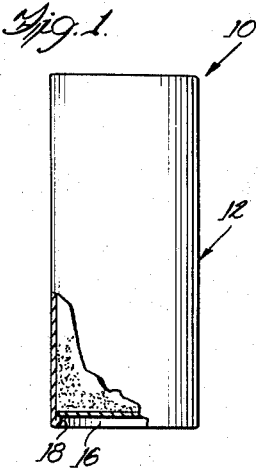
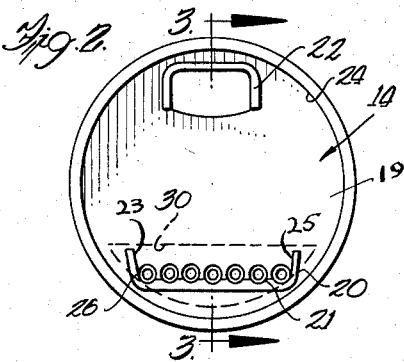
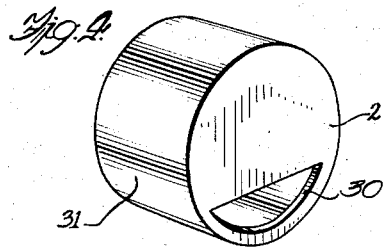
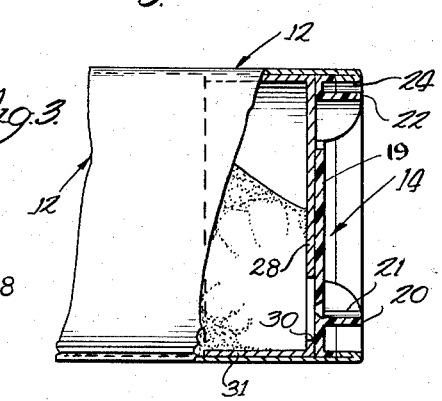
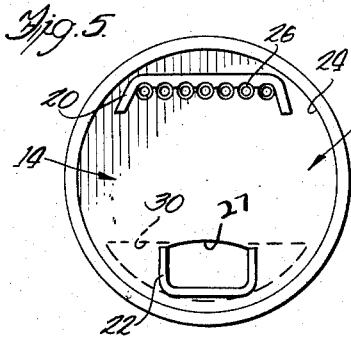
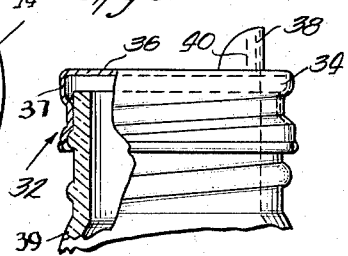
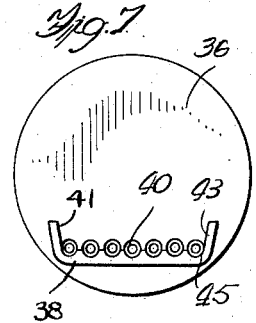
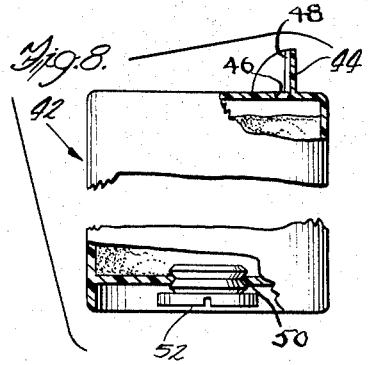
Inventor
John C. Setecka
John F. Brezina
Attorneys

United States Patent Office 3,144,181
Patented Aug. 11, 1964

3,144,181
PARTICLE DISPENSER
John C. Setecka, 1931 S. Austin Ave., Cicero, Ill.
Filed Jan. 23, 1963, Ser. No. 253,333
5 Claims. (Cl. 222—480)

This invention relates to particle dispensers and more particularly to a dispenser for condiments characterized by discrete particles.

Heretofore, condiment dispensers, such as salt shakers and the like, have been formed with perforated caps and elongated spouts surrounding the perforated area to distribute the particles that are shaken through the perforations. These prior art spouts are typically curvilinear and are commonly of bare metal such as aluminum or the like. A disadvantage of these prior art dispensers is that the spouts are of a color similar to that of the condiment dispensed. As a result, it is not possible to determine just how much of the condiment is being used. This is particularly so in the dispensing of salt over an aluminum spout into a white soup, for instance. Another disadvantage of prior art dispensers is that the curved spout effects a concentration of the condiment along the trough of the spout with result that an excess of the condiment is added to one place in a soup or salad, for instance. A further disadvantage of prior art dispensers is that no means are provided for effecting a flow of excess condiment from the spout back into the dispenser.

A principal object of the invention is, therefore, to provide a condiment dispenser by means of which condiments such as salt and the like may be dispensed evenly and accurately and in which the excess condiment is conveniently returned to the dispenser.

A further object of the invention is to provide a condiment dispenser in which the condiment is initially shaken onto an elongated spout of a color contrasting with the color of the particular condiment and in which means are provided for effecting an even distribution of the condiment along the length of the spout.

Another object of the invention is to provide a dispenser of the stated type which is characterized by ease and facility of manufacture and convenience of use.

Further objects and advantages of the present invention will become apparent as the following description of an illustrative embodiment proceeds, taken along with the accompanying drawings, in which:

FIGURE 1 is an elevational view, partly in section, of a condiment dispenser made in accordance with the present invention;

FIGURE 2 is an enlarged plan view of the condiment dispenser of FIGURE 1 illustrated with the dispensing assembly in the position for dispensing individual particles;

FIGURE 3 is a sectional view taken substantially on line 3—3 of FIGURE 2;

FIGURE 4 is a view in perspective of a stationary part of the dispenser assembly;

FIGURE 5 is a view similar to FIGURE 2 but showing the dispenser assembly in the position in which greater quantities of the condiment may freely flow;

FIGURE 6 is a fragmentary sectional view of a condiment dispenser made in accordance with a modified form of the present invention;

FIGURE 7 is a plan view of the form of the invention of FIGURE 6; and

FIGURE 8 is a fragmentary elevational view partly in section of a further modified form of the present invention.

Referring now to the drawings, and more particularly to FIGURES 1 and 2, the dispenser of the present invention is indicated generally by reference numeral 10 and includes a casing or housing 12 having at the top thereof, as viewed in FIGURE 1, a dispenser assembly 14. The casing 12 has a bottom wall 16 which rests on the inwardly and upwardly extending lower edges of the casing 12.

The dispenser assembly 14 includes a rotatable plate 19, of plastic or the like. Formed integrally with the plate 19 is an elongated spout 20 having a plurality of flutes or channels 21 extending transversely of said spout and having curved edges 23 and 25. A plurality of aligned tapered openings 26 are formed in the rotatable plate 19, one in register with each of the flutes 21. According to an important feature of the invention the spout 22 is of a color contrasting with that of the condiment being dispensed. For instance, the spout 21 would be preferably black for a salt dispenser. By this arrangement, the condiment can be easily seen as it flows, particle by particle, along the flutes 21 when the dispenser is shaken while held substantially horizontally. An important advantage of the channels or flutes 21, being on a straight path, is that, as the salt or granular contents are slowly poured out of the respective holes 26, the granules will not run and merge together in a mass when the container is tilted sidewise; so that thereby the granules moving out of each particular hole will move only along and through the adjacent channel 21 which is in register with its particular adjacent hole 26. Additionally, the tapering of holes 26 provides for easy falling back of the granules through said holes when the dispenser is tipped back toward upright position.

Also integrally formed in the rotatable plate 19 is a spout 22 and a relatively large opening 27. A stationary plate 28 forms a part of the dispenser assembly 14 and has an opening 30 at one side thereof. The plate 28 may be affixed to the casing 12 by any suitable means. As illustrated the plate 28 is integrally formed with an axially extending annular flange 31 which is secured by any suitable means, such as cement or the like to the inner wall of the casing 12.

In operation, the plate 19 may be selectively rotated so that either the openings 26 are in register with the opening 30 or the opening 27 is in register with the opening 30. By this arrangement the condiment may be selectively sprinkled or poured.

In FIGURES 6 and 7 is shown a modified form of the present invention indicated generally by reference numeral 32. In this form of the invention a cap 34, of plastic or the like, is provided with a top 36 and an annular threaded flange 37. The cap 34 is constructed and arranged for threaded reception of a correspondingly threaded container 39 of glass, plastic or the like. A spout 38 is integrally formed with the cap 34 and has curved end edges 41 and 43 and flutes or channels 45, each in substantial registry with a tapered opening 40.

In FIGURE 8 is shown a further modified form of the present invention in which a casing 42, of glass, plastic or the like, is formed with a spout 44 similar to that of the other forms of the invention. In this instance the top of the casing is formed with a plurality of aligned tapered openings 46 each in substantial register with one of the flutes 48 forming a part of the spout 44. In the form of the invention shown in FIGURE 8 an opening 50 is formed in the bottom of the casing for reception of the condiment and this opening is normally closed while the dispenser is in use by means of a screw cap 52, or the like.

The dispenser of the present invention exhibits important advantages over particle dispensers heretofore known. For instance, all of the above described forms of the present invention are characterized by readily visible controlled sprinkling of discrete particles such as condiment particles. The flutes or channels of the several forms of the invention assure wide distribution of the particles throughout the length of the spout. Thus, the inadvertent accumulation of a collection of particles adjacent one or the other of the curved ends of the respective spouts is effectively prevented. Furthermore, the flute arrangement assures ready visibility of each particle. The cap of the form of the invention illustrated in FIGURES 6 and 7 may be readily dimensioned to accommodate receptacles of standard design. The dispenser of the form of the invention illustrated in FIGURE 8 is particularly adapted to receive decorative embellishments since the dispensing assembly and the casing are formed integrally.

In all of the above forms of the invention excess condiment may be conveniently returned to the dispenser merely by tipping the dispenser oppositely so that the particles fall into the tapered openings.

Although particular embodiments of the invention have been shown and described in full herein, there is no intention thereby to limit the scope of the present invention to the details of the described embodiments. It is applicant's intention to be limited only by the scope of the appended claims.

I claim:

1. A dispenser for discrete particles comprising a casing forming a reservoir for said particles, said casing having a top wall with a discharge and inlet opening therein; and means for dispensing said particles in a series of parallel coplanar streams, said means comprising a rotatable plate adjacent said top wall, said plate having a plurality of aligned openings;

an elongated spout arranged in limited spaced relation to said aligned openings and having angularly extending retaining edges on the opposite ends thereof, said spout having a plurality of transversely extending channels, each of said channels being in register with one of said openings whereby the particles in said reservoir flow through said aligned openings and along said channels when the casing is tilted and agitated.

2. A dispenser for discrete particles comprising a casing forming a reservoir;

means for selectively discharging the particles in a steady stream or in a series of spaced parallel streams, said means comprising a dispenser assembly including a stationary plate having an opening at one side thereof;

a rotatable plate having an opening at one side thereof for discharging the particles in a steady stream;

a plurality of aligned openings at the opposite side of said rotatable plate, said rotatable plate being selectively rotatable to afford selective registry of said first opening of said rotatable plate with said opening of said stationary plate or said series of openings of said rotatable plate with the opening of said stationary plate, said rotatable plate being formed with an elongated spout arranged in limited parallel relation to said series of openings;

said spout being formed with a plurality of channels each in register with one of the openings of said series whereby the particles may be discharged from said casing in a plurality of separate parallel streams when the series of openings of said rotatable plate are in register with the opening of said stationary plate, and whereby the particles may be discharged in a steady stream when said first opening of said rotatable plate is in register with the opening of said stationary plate.

3. A dispenser for discrete particles comprising a casing, a removable cover on said casing;

a plurality of aligned openings in said cover;

an elongated spout integrally formed with said cover and arranged in limited spaced relation to said openings, said spout having a plurality of channels each in register with one of said openings and having angularly bent end portions adapted to retain particles within said spout, whereby the particles may be discharged from said casing and may flow through said channels in separate visible streams of successive particles, said casing having an opening providing access for filling said casing.

4. A dispenser in accordance with claim 1 wherein said elongated spout is mounted on said plate and wherein said top wall opening is spaced from said first mentioned aligned openings, and having a second spout mounted adjacent said second opening.

5. In a dispenser for comminuted particles including a reservoir with a threaded top, a dispenser cap comprising a sleeve internally threaded to mate with the reservoir top, a cap top transversely closing one end of the sleeve, a spout having upstanding side walls fixed to the cap and extending angularly outwardly from the plane of the cap top, discharge means comprising laterally spaced aligned holes located between the side walls of the spout spade and in substantially a straight path to discharge and receive the comminuted contents of the associated reservoir; said spout having a plurality of particle-guiding channels therein in substantial registry with said holes respectively.

References Cited in the file of this patent
UNITED STATES PATENTS

| | | |
|---|---|---|
| 199,896 | Burger | Feb. 5, 1878 |
| 909,202 | McWilliams | Jan. 12, 1909 |
| 924,959 | Bennett | June 15, 1909 |
| 1,924,999 | Mills | Aug. 29, 1933 |
| 2,545,350 | Fuld | Mar. 13, 1951 |
| 2,568,526 | Waring | Sept. 18, 1951 |
| 2,645,382 | Plough | July 14, 1953 |